(12) United States Patent
Miller et al.

(10) Patent No.: US 6,253,544 B1
(45) Date of Patent: *Jul. 3, 2001

(54) METHOD AND APPARATUS FOR REDUCING POLLUTANTS

(75) Inventors: Robert N. Miller, Acworth, GA (US); Robert P. Caren, Westlake Village, CA (US); Jack A. Ekchian, Belmont, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 34 days.

This patent is subject to a terminal disclaimer.

(21) Appl. No.: 09/414,452

(22) Filed: Oct. 7, 1999

Related U.S. Application Data

(63) Continuation of application No. 09/103,249, filed on Jun. 23, 1998, now Pat. No. 6,012,283, which is a continuation of application No. 08/671,955, filed on Jun. 28, 1996, now Pat. No. 5,806,305, which is a continuation-in-part of application No. 08/575,698, filed on Dec. 19, 1995, now Pat. No. 5,692,481, which is a continuation-in-part of application No. 08/245,327, filed on May 18, 1994, now abandoned.

(51) Int. Cl.[7] .................................................. F01N 3/00
(52) U.S. Cl. .................. 60/275; 60/274; 60/287; 60/289; 60/303; 422/186.3
(58) Field of Search .................. 60/274, 275, 286, 60/303, 287, 288, 289; 422/186.3, 186.07, 186.29

(56) References Cited

U.S. PATENT DOCUMENTS

| 1,333,836 | 3/1920 | Csanyi . |
| 1,725,661 | 8/1929 | McPartland . |
| 1,982,484 | 11/1934 | Runge . |

(List continued on next page.)

FOREIGN PATENT DOCUMENTS

| 4400653 | 7/1995 | (DE) . |
| 0 366 876 A1 | 5/1990 | (EP) . |
| 1364714 | 10/1964 | (FR) . |
| 2481945 | 11/1981 | (FR) . |
| 4-276167 | 10/1992 | (JP) . |
| 5-332128 | 12/1993 | (JP) . |
| 98/09699 | 3/1998 | (WO) . |
| WO 98/08592 | 3/1998 | (WO) ........................ 53/32 |

OTHER PUBLICATIONS

Penetrante, et al., "Non–Thermal Plasma Techniques for Pollution Control—Part A: Overview, Fundamentals and Supporting Technologies", (1993) p. 65 (Springer–Verlag, Berlin).

Rogers et al., "The Removal of Nitric Oxide using a Non-Thermal Plasma Discharge Device", http.//www.gnt.nct/rogersjw/nox/nox.htm1.

Southwest Research Institute (SwRI) News release, 1996, "SwRI nonthermal plasma reactor neutralizes harmful emissions", http://www.swri.org/9what/releases/plasma.htm.

Kintaichi, et al., "Selective Reduction of Nitrogen Oxides with Hydrocarbons Over Solid Acid Catalysts in Oxygen Rich Atmospheres," Catalysis Letters 6 (1990) 239–244.

*Plasma Exhaust Aftertreatment*, SAE SP–98/1395, Library of Congress Catalog Card No.: 98–86679, Copyright © 1998 Society of Automotive Engineers, Inc.

(List continued on next page.)

*Primary Examiner*—Thomas Denion
*Assistant Examiner*—Binh Tran
(74) *Attorney, Agent, or Firm*—Pennie & Edmonds LLP

(57) ABSTRACT

A method and apparatus are provided for improving the conversion efficiency of a catalytic converter for treating exhaust gases produced from the combustion of a fuel to at least reduce pollutants from incomplete combustion, wherein the reduction in pollutants is achieved by the introduction of ozone, upstream from the catalytic converter, to improve the efficiency of the catalytic converter.

318 Claims, 3 Drawing Sheets

U.S. PATENT DOCUMENTS

| | | |
|---|---|---|
| 3,188,167 | 6/1965 | Specht . |
| 3,896,616 | 7/1975 | Keith et al. . |
| 3,979,193 | 9/1976 | Sikich . |
| 3,983,021 | 9/1976 | Henis ................................... 204/164 |
| 4,041,922 | 8/1977 | Abe et al. . |
| 4,118,193 | 10/1978 | Neti et al. . |
| 4,185,316 | 1/1980 | Fleck .................................... 361/230 |
| 4,195,606 | 4/1980 | Wallis, Jr. et al. . |
| 4,309,199 | 1/1982 | Suzuki . |
| 4,434,771 | 3/1984 | Slomnicki . |
| 4,519,357 | 5/1985 | McAllister . |
| 4,780,277 | 10/1988 | Tanaka ..................................... 422/4 |
| 4,902,487 | 2/1990 | Cooper ............................. 423/215.5 |
| 4,945,721 * | 8/1990 | Cornwell et al. ...................... 60/274 |
| 4,954,320 | 9/1990 | Brimingham ........................ 422/186 |
| 4,968,396 | 11/1990 | Harvey . |
| 4,979,364 | 12/1990 | Fleck ..................................... 60/274 |
| 5,097,665 | 3/1992 | Kammel . |
| 5,154,807 | 10/1992 | Harvey . |
| 5,284,556 | 2/1994 | Rich . |
| 5,402,639 | 4/1995 | Fleck ..................................... 60/275 |
| 5,410,871 | 5/1995 | Masters et al. . |
| 5,419,123 * | 5/1995 | Masters ................................ 60/274 |
| 5,433,832 | 7/1995 | Rich et al. . |
| 5,440,876 | 8/1995 | Bayliss et al. . |
| 5,474,747 | 12/1995 | Hayashi et al. . |
| 5,487,874 | 1/1996 | Gibboney, Jr. . |
| 5,549,795 | 8/1996 | Gregoire et al. . |
| 5,609,736 | 3/1997 | Yamamoto ........................... 204/164 |
| 5,623,819 | 4/1997 | Bowker et al. . |
| 5,649,507 | 7/1997 | Gregoire et al. . |
| 5,655,210 | 8/1997 | Gregoire et al. . |
| 5,692,481 * | 12/1997 | Miller ................................... 123/539 |
| 5,695,619 | 12/1997 | Williamson et al. . |
| 5,711,147 | 1/1998 | Vogtlin et al. . |
| 5,746,984 | 5/1998 | Hoard . |
| 5,771,683 | 6/1998 | Webb . |
| 5,806,305 * | 9/1998 | Miller et al. ........................... 60/274 |
| 5,843,288 | 12/1998 | Yamamoto ........................... 204/164 |
| 5,843,383 | 12/1998 | Williamson et al. . |
| 5,847,494 | 12/1998 | Bayliss et al. . |
| 5,855,855 | 1/1999 | Williamson et al. . |
| 5,863,413 * | 1/1999 | Caren et al. ......................... 205/688 |
| 5,891,409 | 4/1999 | Hsiao et al. . |
| 5,893,267 | 4/1999 | Vogtlin et al. . |
| 5,942,026 * | 8/1999 | Erlichman et al. ...................... 96/58 |
| 6,012,283 * | 1/2000 | Miller et al. ........................... 60/274 |
| 6,119,455 | 10/2000 | Hammer ................................ 60/301 |

OTHER PUBLICATIONS

Suhr et al., "Reduction of Nitric Oxide in Flue Gases by Point to Plane Corona Discharge with Catalytical Coatings on the Plane Electrode," Combust. Sci. and Tech., vol. 72. pp. 101–115.

Penetrante et al., "Comparison of Electrical Discharge Techniques for Nonthermal Plasma Processing of NO in $N_2$," IEEE Transactions on Plasma Science, vol. 23, No. 4, Aug. 1995, 679–687.

Whealton et al., "971718 Non–Thermal Plasma Exhaust Aftertreatment: A Fast Rise–Time Concept," Manuscript based on work preformed at the Oak Ridge National Laboratory, managed by Lockheed Martin Energy Research Corporation for the U.S. Dept. of Energy under contract No. DE–AC05–96OR22464, 1–14.

Fanick et al., "Simultaneous Reduction of Diesel Particulate and $NO_x$ Using a Plasma," SAE Technical Paper Series 942070, 239–246.

Hepburn et al., "The Pulse Flame Combustor Revisited," 962118 Ford Motor Co., 1–36.

Sztenderowicz et al., of Chevron Research and Technology Co. et al., "Effects of Fuel Sulfur Level on Emissions from Transitional Low Emission Vehicles," 952561, 2067–2082.

Burch et al., "Mechanism of the Selective Reduction of Nitric Oxide by Propene on Platinum–Based Catalysts in the Presence of Excess Oxygen," Symposium on Nox Reduction before the Division of Petroleum Chemistry, Inc. $207^{th}$ National Meeting, American Chemical Society, San Diego, CA, Mar. 13–18, 1994, pp. 150–153.

Liu et al., "In Situ XANES Characterization of Cu in Cu–ZSM–5 during Selective Catalytic Reduction of NO by Hydrocarbon," Symposium on Nox Reduction Presented before the Division of Petroleum Chemistry, Inc. $207^{th}$ National Meeting, American Chemical Society, San Diego, CA, Mar. 13–18, 1994, pp. 107–111.

Yasuda et al., "IR Study of Catalytic Reduction of Nitrogen Monoxide by Propene in the Presence of Oxygen over Ce–Exchanged ZSM–5 Zeolite," Symposium on NO Reduction Presented before the Division of Petroleum Chemistry, Inc. 207th National Meeting, American Chemical Society, San Diego, CA, Mar. 13–18, 1994, pp. 99–102.*

Yamamoto, T. et al., "Control of Volatile Organic Compounds by an ac Energized Ferroelectric Pellet Reactor and a Pulsed Corona Reactor," *IEEE Transactions on Industry Applications*, vol. 128.No. 3, pp. 528–534 (1992).*

Chang, M.B. et al., "Gas–Phase Removal on NO from Gas Streams via Dieletric Barrier Discharges," *Environ. Sci. technol.* vol. 26, pp. 777–781 (1992).*

Chang, J–S. et al., "Corona Discharge Processes," *IEEE Transaction on Plasma Science*, vol. 19, pp. 1152–1165 (1991).*

Eliasson, B., "Nonequilibrium Volume Plasma Chemical Processing," *Environ. Sci. Technol.*, vol. 19 pp. 1063–1077 (1991).*

Hamada et al., "Transition metal–promoted silica and alumina catalysts for the selective reduction of nitrogen monoxide with propane," Applied Catalysis, 70 (1991) L1–L8.*

* cited by examiner

Step 1

> Adding Ozone to the combustion flow at least one point upstream from a catayltic converter for treating exhaust gases produced from the combustion of a fuel to at least reduce one pollutant from incomplete Combustion and/or oxides of nitrogen Step 2

> Treating the exhaust gases with the catalytic converter

FIG. 5

METHOD AND APPARATUS FOR REDUCING POLLUTANTS

This is a Continuation of U.S. application Ser. No. 09/103,249, filed Jun. 23, 1998, now U.S. Pat. No. 6,012,283 which is a Continuation of U.S. application Ser. No. 08/671,955 filed Jun. 28, 1996, now U.S. Pat. No. 5,806,305 which is a Continuation-in-Part of U.S. application Ser. No. 08/575,698 filed Dec. 19, 1995, now U.S. Pat. No. 5,692,481 which is a Continuation-in-Part of U.S. application Ser. No. 08,245,327 filed May 18, 1994, now abandoned.

BACKGROUND OF THE INVENTION

1. Field of the Invention

The present invention generally relates to a method and apparatus for reducing pollutants by improving the conversion efficiency of a catalytic converter for treating exhaust gases produced from the combustion of fuels, and more particularly, to such a method and apparatus wherein the reduction in pollutants is achieved by the use of ozone.

2. Background

Internal combustion engines, which operate by the controlled combustion of hydrocarbon fuels, produce exhaust gases containing complete combustion products of $CO_2$ and $H_2O$ and also pollutants from incomplete combustion, such as CO, which is a direct poison to human life as well as unburnt hydrocarbons (HC). Further, due to the very high temperatures produced by the burning of the hydrocarbon fuels, thermal fixation of nitrogen in the air results in the detrimental formation of $NO_x$.

The quantity of pollutants varies with many operating conditions of the engine but is influenced predominantly by the air-to-fuel ratio in the combustion cylinder such that conditions conducive to reducing carbon monoxide and unburnt hydrocarbons (a fuel mixture just lean of stoichiometric and high combustion temperatures) cause an increased formation of $NO_x$ and conditions conducive to reducing the formation of $NO_x$ (rich fuel mixture and low combustion temperatures) cause an increase in carbon monoxide and unburnt hydrocarbons in the exhaust gases of the engine. As a result, within the region of stable operation of the internal combustion engine, a significant amount of CO, HC and $NO_x$ is emitted into the atmosphere.

Although the presence of pollutants in the exhaust gases of internal combustion engines has been recognized since 1901, the need to control internal combustion engine emissions in the U.S. came with the passage of the Clean Air Act in 1970. Engine manufacturers have explored a wide variety of technologies to meet the requirements of the Clean Air Act. Catalysis has proven to be the most effective passive system.

Auto emission catalytic converters are typically located at the underbody of the automobile and are situated in the exhaust stream from the engine, just before the muffler, which is an extremely hostile environment due to the extremes of temperature as well as the structural and vibrational loads encountered under driving conditions.

Nearly all auto emission catalytic converters are housed in honeycomb monolithic structures that are generally made of cordierite, a low-thermal-expansion ceramic with excellent strength and crack resistance under thermal shock. The honeycomb construction provides a relatively low pressure drop and a high geometric surface area that enhances the mass-transfer-controlled reactions.

An adherent washcoat, generally made of stabilized gamma alumina into which the catalytic components are incorporated, is deposited on the walls of the honeycomb. The active catalyst contains about 0.1 to 0.15% precious metals, primarily platinum (Pt), palladium (Pd) or rhodium (Rh). The honeycomb is set in a steel container and protected from vibration by a resilient matting.

The first generation of catalytic converters, from 1976 to 1979 focused solely on the oxidation of CO and HC. $NO_x$ was decreased by engine modification and operating conditions and not addressed by use of catalysis. In contradistinction, the second generation of catalytic converters, from 1979 to 1986, not only oxidized CO and HC, but also reduced $NO_x$.

Because $NO_x$ reduction is most effective in the absence of $O_2$, while the abatement of CO and HC requires $O_2$, the construction of an effective means of reducing these emissions requires that the engine be operated close to the stoichiometric air-to-fuel ratio, because, only under these conditions can all three pollutants be converted simultaneously. The use of an oxygen sensor, which is positioned before the catalyst, makes it possible to maintain the air-to-fuel ratio within the narrow window required so that three-way catalysis (TWC) is possible.

Because the exhaust oscillates from slightly rich to slightly lean as a result of system time lag in adjusting the ratio, an oxygen storage medium is added to the washcoat that adsorbs (stores) oxygen during the lean part of the cycle and releases it to react with excess CO and HC during the rich portion. $CeO_2$ is most frequently used for this purpose due to its desirable reduction-oxidation response.

TWC technology for simultaneously converting all three pollutants comprises the use of precious metals Pt and Rh (Pt-to-Rh ratio of 5-to-1), with Rh being most responsible for the reduction of $NO_x$, although it also contributes to CO oxidation along with Pt. The basic operation of the catalyst is to oxidize CO and HC to $CO_2$ and $H_2O$ and reduce $NO/NO_2$ to $N_2$.

Third generation converters, i.e., those from 1986 to 1992, evolved as auto operating strategies shifted to include greater fuel economy at higher operating speeds, by shutting off fuel during deceleration, which exposed TWC's to higher temperatures and a highly oxidizing atmosphere, causing Rh to react with the gamma alumina of the washcoat and form an inactive aluminate. Properly designed catalysts recover their activity to a great extent under rich fuel mixtures, however, Rh may also react with $CeO_2$ at high temperature, reducing the activity of both. This drawback is overcome by segregating the two in washcoats with multiple layers or by stabilizing the ceria with oxides of Zr, Ba and La.

In fourth generation TWC's, which began to appear in 1995, less expensive Pd was substituted for or used in combination with Pt and Rh. While the operation of fourth generation TWC's is consistent with prior catalytic converters, there is still a significant amount of pollutants emitted into the atmosphere by the catalytically treated exhaust gases of internal combustion engines.

The recent passage of the 1990 amendment to the Clean Air Act requires further significant reductions in the amount of pollutants being released into the atmosphere by internal combustion engines. In order to comply with these requirements, restrictions on the use of automobiles and trucks have been proposed, such as, employer compelled car pooling, HOV lanes, increased use of mass transit as well as rail lines and similar actions limiting automobile and truck utilization at considerable cost and inconvenience.

An alternative to diminished automobile and truck usage is decreasing emissions by increasing the efficiency of the internal combustion engine. This approach presents a considerable challenge because studies show that 70% of automobile originated pollution is contributed by only 30% of the vehicles on the road, these vehicles typically being older models having inefficient engines that inherently produce a lot of pollution. Moreover, these older vehicles oftentimes have difficulty passing required emission tests, resulting in an increased cost to the owner for tune-ups or new catalytic converters, such maintenance procedures sometimes failing to adequately cure the problem so that the vehicle still cannot pass the required emissions test.

In addition, while considerable gains have been made in recent years to reduce the amount of pollutants in the exhaust gases of the internal combustion engine of vehicles such as automobiles and trucks, it is difficult and expensive to further reduce the amount of pollutants in the exhaust gases of the internal combustion by increasing the efficiency of engines now being designed for use in new vehicles, even though exhaust emissions of automobiles and trucks currently being manufactured do not meet proposed Environmental Protection Agency standards.

In lieu of decreasing exhaust emissions by increasing the efficiency of the internal combustion engine or decreasing the use of automobiles, a further alternative would be to increase the efficiency of the catalytic converter, however, only minimal success has been achieved.

In this regard, the conversion efficiency of a catalytic converter is measured by the ratio of the rate of mass removal in the catalytic converter of the particular constituent of interest to the mass flow rate of that constituent into the catalytic converter. The conversion efficiency of a catalytic converter is a function of many parameters including temperature, stoichiometry, the presence of any catalysts' poisons (such as lead, sulfur and carbon) the type of catalyst and the residence time of the exhaust gases in the catalytic converter. At start-up the conversion efficiency of a catalytic converter is low.

SUMMARY OF THE INVENTION

One object of the present invention to provide a method and apparatus for reducing pollutants in the exhaust gases of an internal combustion engine having a catalytic converter by improving the conversion efficiency of the catalytic converter without the need for major modifications to the internal combustion engine or the catalytic converter.

Another object of the present invention is to provide a method and apparatus for reducing pollutants of incomplete combustion in the exhaust gases treated by a catalytic converter which are inexpensive to employ and manufacture, simple in structure and operation.

A particularly advantageous feature of preferred embodiments of the present invention is that it provides a relatively inexpensive way to reduce pollution by retrofitting those engine and catalyst combinations already on the road which contribute the most pollution and are most likely to fail an emission test as well as providing easy installation in new engine systems.

A further particularly advantageous feature of preferred embodiments of the present invention is that the improved efficiency of the catalytic converter is achieved by adding ozone to modify the composition of the gases entering the catalytic converter in real-time without the need to store special chemical additives on-board.

Yet another advantageous feature of preferred embodiments of the present invention is that it can be applied to a variety of different types of internal combustion engines, including, but not limited to, automobiles, trucks, stationary power generators, motorboats, motorcycles, motorbikes, lawn mowers, chain saws or leaf blowers which may use a variety of different fuels such as gasoline, gasoline-based formulations, diesel fuel, alcohol, natural gas and any other fuel where a catalytic converter can be used to reduce at least one pollutant.

These and other objects, advantages and features of the present invention are achieved, according to one embodiment of the present invention, by an apparatus comprising: 1) a combustion chamber having a pre-combustion flow stream, including air, to the combustion chamber and a post-combustion flow stream of exhaust from the combustion chamber, 2) a catalytic converter for treating the exhaust gases to reduce the amount of at least one pollutant from incomplete combustion of fuel and/or oxides of nitrogen, and 3) a device for adding ozone to at least one of the pre-combustion flow stream to the combustion chamber and the post-combustion flow stream from the combustion chamber upstream from the catalytic converter to reduce the amount of the at least one pollutant in exhaust gases treated by the catalytic converter.

According to one embodiment of the present invention, the device for adding ozone comprises an ultraviolet light emitting lamp that emits light having a wavelength of about 185 nanometers which is inserted into at least one of the pre-combustion flow or post-combustion flow streams so that the oxygen in the intake air, air/fuel mixture and/or exhaust gases are exposed to ultraviolet light to generate ozone which enhances the conversion efficiency of the catalytic converter.

According to another embodiment of the present invention, the device for adding ozone is positioned remotely of the pre-combustion and post-combustion flow streams and ozone enriched air is piped into the combustion flow stream. In this embodiment, the device draws in ambient air independently of the operation of the engine, for example, using a pumping mechanism. The ambient air is converted to ozone enriched air by exposure, for example, to UV light, and added to at least one of the pre-combustion or the post-combustion flow streams in accordance with the teachings of the present invention. A particularly advantageous feature of this embodiment is that it provides the flexibility of installing the ozone generator at a convenient location in the engine compartment or elsewhere on the vehicle. Another advantageous feature of this embodiment is that the ozone could be introduced at most any desirable point in the intake or exhaust streams. A further advantageous feature of this embodiment is that the flow rate of ozone from the ozone generator is independent of engine speed, i.e., flow of air to the combustion chamber or flow of exhaust gases from the combustion chamber. Thus, at low engine speeds, the mass flow rate of ozone will not be affected by low air mass flow through the combustion chamber.

In accordance with the present invention, a method is also provided for improving the conversion efficiency of a catalytic converter for treating exhaust gases to at least reduce one pollutant from incomplete combustion produced from the combustion of a fuel in a combustion chamber having a pre-combustion flow stream of at least ambient air to the combustion chamber and a post-combustion flow stream of exhaust gases from the combustion chamber, the method comprising the steps of: adding ozone to at least one of the pre-combustion and the post-combustion flow streams at at least one point upstream from a catalytic converter for treating exhaust gases produced from the combustion of the fuel to at least reduce one pollutant from incomplete combustion, and treating the exhaust gases with the catalytic converter.

BRIEF DESCRIPTION OF THE DRAWINGS

FIG. 5 is a block diagram illustrating the method of the present invention.

DETAILED DESCRIPTION OF THE PREFERRED EMBODIMENT(S)

Figure 1:
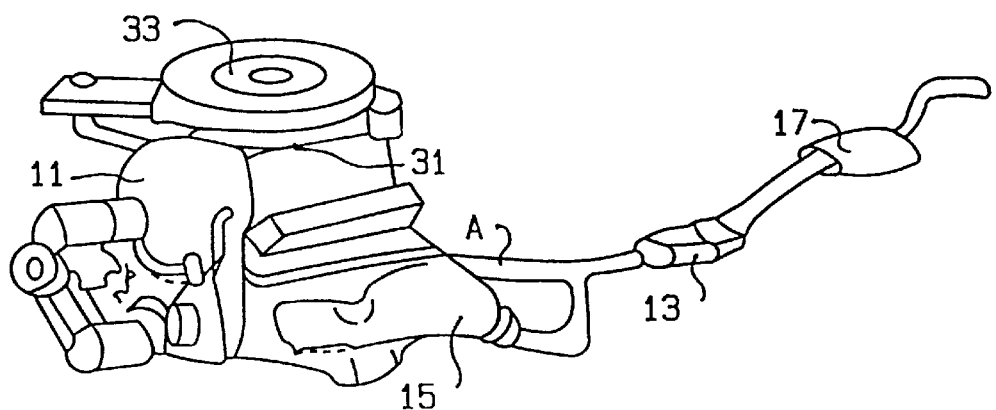
FIG. 1 is a side perspective view, of a known configuration of an internal combustion engine having a catalytic converter.

Referring to FIG. 1, a known configuration of an automobile engine 11 having a catalytic converter 13 is illustrated. The catalytic converter 13 is positioned at the underbody of the automobile (not shown) and is situated in the exhaust stream from the engine, downstream from the exhaust manifold 15 and just before the muffler 17.

The catalytic converter 13, as contemplated for use in the present invention, includes any device which is provided for treating exhaust gases from the combustion of a fuel, such as, for example, gasoline, gasoline-based formulations, diesel fuel, alcohol, natural gas and any other fuel where a catalytic converter can be used to reduce at least one pollutant from incomplete combustion, such as, for example, CO, and unburnt hydrocarbons (HC), and/or $NO_x$, including, but not limited to, a three way catalyst typically used in today's modern automobile engines.

The catalytic converter 13 comprises, therefore, any device that catalytically removes at least one pollutant from an exhaust stream generated by combusting a fuel, including, but not limited to, those with monolithic or granular ceramic substrates, metallic substrates, or substrates of any kind, and devices with noble metals or any other type of catalytic material. It would also include, without limitation, devices having semiconductor catalysts, such as, oxides or sulphides of transition elements, and devices having ceramic type catalyst, such as alumina, silica-alumina, and zeolites individually, in combination with each other or in combination with metal catalysts.

As is well understood in the art, an internal combustion engine draws in ambient air which is mixed with fuel for combustion in a combustion chamber or cylinder and the resulting exhaust gases are expelled. Ignition of the air/fuel mixture in the cylinder is typically achieved by an ignition device, such as, for example, a spark plug or the like, or adiabatic compression to a temperature above the fuel's ignition point.

The flow of air to any combustion chamber, including the flow of the air/fuel mixture if applicable, is hereinafter referred to as the pre-combustion flow stream, and the resulting flow of exhaust therefrom is hereinafter referred to as the post-combustion flow stream. As used herein, the pre-combustion and post-combustion flow streams are hereinafter collectively referred to as the combustion flow stream.

In certain internal combustion engines, such as for example, gasoline engines commonly in use today, air is inducted via an air intake duct or port which conveys the ambient air to a carburetor or fuel injection arrangement where the air is mixed with fuel to create a air/fuel mixture. The air/fuel mixture is then conveyed via an intake manifold to the combustion chamber or cylinder of the engine. In diesel-type engines and certain spark ignition engines, the air and fuel are mixed in the combustion chamber or cylinder of the engine.

After the air/fuel mixture has been burnt, the resulting exhaust gases are expelled from the combustion chamber to an exhaust manifold. The exhaust gases are then conveyed, via at least one exhaust pipe to the catalytic converter where pollutants are removed.

Figure 2:
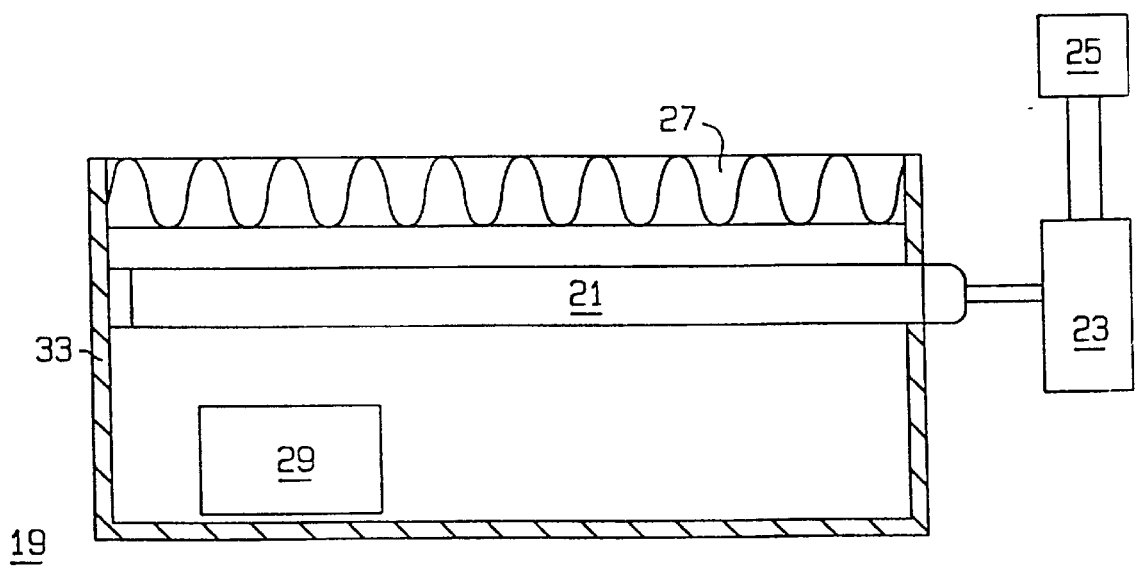
FIG. 2 is a side view, partially-in-section, illustrating one embodiment of the apparatus of the present invention wherein an ozone generating device is inserted into at least one of the pre-combustion flow or post-combustion flow streams.

Referring to FIG. 2, one embodiment of an apparatus of the present invention is illustrated generally at 19. The apparatus 19 comprises a device for generating ozone, for example, an ultraviolet light emitting lamp 21, for example, a mercury vapor arc lamp having a light transmitting envelope for transmitting ultraviolet light having a wavelength of about 185 nanometers, because this emission is capable of producing ozone in air.

The type of envelope preferred for transmitting light at a frequency of about 185 nanometers is fused silica or its equivalent, synthetic quartz. The lamp 21 is connected to a transformer 23, for example, a Bodine Model 12R25E/GS transformer, which converts 12 volt battery power to the voltage and frequency required to operate the lamp 21.

The transformer 23 is connected to the electrical system 25 of the engine 11 in order to provide power for operating the lamp 21. The transformer 23 is directly connected to the electrical system 25 of the automobile by splicing into the hot wire (not shown) of the system, for example, as original equipment on a new vehicle. Alternatively, the transformer 23 is connected to the electrical systems 25 by using a plug adapted to be inserted into a cigarette lighter receptacle in the passenger compartment of the vehicle.

In the apparatus 19 as illustrated by FIG. 2, the lamp 21 is positioned upstream from the engine's carburetor or fuel injection system, generally indicated at 31 in FIG. 1, for example, between an air filter 27 and air intake duct 29, however, the present invention additionally contemplates positioning the device for generating ozone upstream from the air filter 27.

In order to retro-fit the apparatus 19 to an existing engine 11, the air filter casing 33 is opened and the lamp 21 is placed between the air filter 27 and the air intake duct 29 and the electrical wire leads of the lamp 21 are placed so that they pass beneath the air filter cover (not shown) so that they are routed out of the casing 33, for example, between the casing 33 and its removable cover (not shown) for connection to the transformer 23.

In order to increase the effective absorption coefficient of the oxygen in the air being inducted into the engine 11, the walls adjacent to the lamp 21 are provided with a surface highly reflective to ultraviolet light in the required range, for example, made of aluminum, in order to increase the mean free path of the 185 nanometer photons, since aluminum maintains its reflectance to ultraviolet light down to 185 nanometers.

Figure 3:
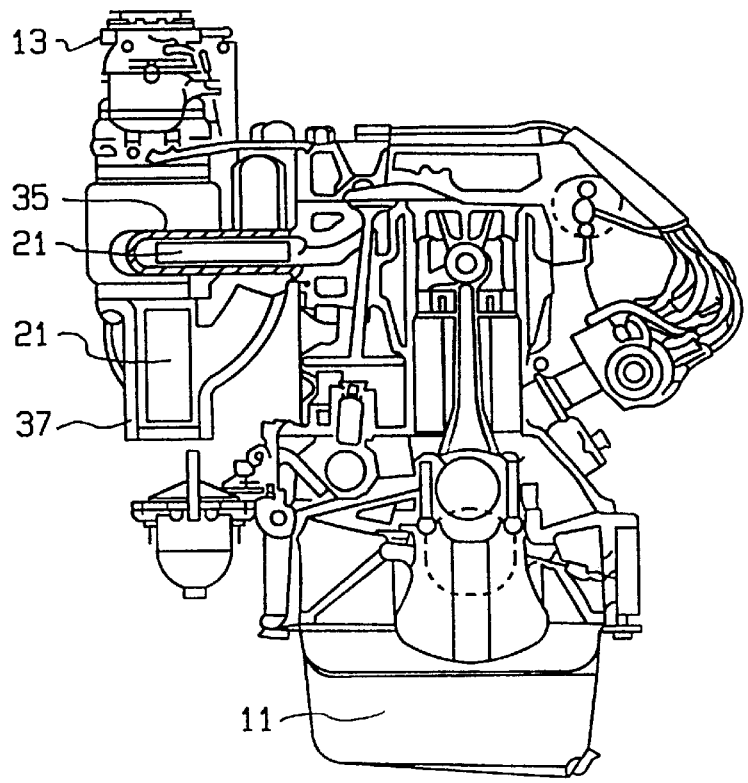
FIG. 3 is a front view, partially-in-section, illustrating a further arrangements of the apparatus of FIG. 2.

According to teaching of the present invention, it is possible to also mount the lamp 21 downstream from the engine's carburetor or fuel injection system 31 and prior to the combustion chamber, for example, in the intake manifold 35 as best seen in FIG. 3. Alternatively, the lamp 21 is mounted downstream from the engine's combustion chamber, for example, in the exhaust manifold 37 as best seen in FIG. 3. In addition, the lamp 21 can be mounted both upstream and downstream of the combustion chamber.

Referring to FIG. 3, a further embodiment of the present invention is illustrated wherein the device for generating ozone is positioned remotely of the pre-combustion and post-combustion flow streams and ozone enriched air is piped into the combustion flow stream. In this embodiment, an auxiliary ozone generator 37 for generating ozone from air, draws in ambient air independently of the operation of the engine, for example, using a pumping mechanism 39. The ambient air is converted to ozone enriched air by exposure, for example, to UV light or by means of an electrostatic discharge device, and added to at least one of the pre-combustion or the post-combustion flow streams in accordance with the teachings of the present invention. In this regard, a mixing device 41 can be used to enhance mixing of the ozone enriched air with the combustion flow stream. It should be noted that in lieu of pumping mechanism 39, ambient air can be drawn in using the vacuum generated by the engine 11.

Table 1 compares the results obtained utilizing the ozone generating apparatus 19 which generates a trace amount of ozone and is situated in the pre-combustion flow stream, upstream from the carburetor or fuel injection system of an engine as illustrated in FIG. 2. The results of the base line tests were conducted without the ozone generating apparatus 19. The engine tested was a 1990 Ford Tarus engine equipped with a production catalytic converter.

| | BASELINE | WITH OZONE | REDUCTION |
|---|---|---|---|
| CARBON MONOXIDE (%) | 0.28 | 0.02 | 92.8% |
| HYDROCARBONS (ppm) | 154 | 12 | 92.2% |

More extensive tests have been conducted with a 1996 Ford Taurus 3.0 L engine using the embodiment of FIG. 3, during which $NO_x$, HC, CO, and $CO_2$ levels were measured upstream as well as downstream of the catalytic converter. It should be noted that this type of engine has two catalytic converters, one connected to the right exhaust manifold and another connected to the left exhaust manifold. The results of these tests are as forth below.

| | | WITH DEVICE OFF BASELINE | | | |
|---|---|---|---|---|---|
| IDLE CONDITIONS EMISSIONS | PPM/ PER- CENT | LEFT CAT-IN | LEFT CAT-OUT | RIGHT CAT-IN | RIGHT CAT-OUT |
| NOX | PPM | 131 | 2.5 | 116 | 1.2 |
| HC | PPM | 2593 | 278 | 2484 | 137 |
| CO | PPM | 5000 | 400 | 5000 | 10 |
| $CO_2$ | % | 13.72 | 14.26 | 13.8 | 14.6 |

| | | WITH DEVICE ON | | | |
|---|---|---|---|---|---|
| IDLE CONDITIONS EMISSIONS | PPM/ PER- CENT | LEFT CAT-IN | LEFT CAT-OUT | RIGHT CAT-IN | RIGHT CAT-OUT |
| NOX | PPM | 127 | 0.2 | 117 | 1.1 |
| HC | PPM | 3048 | 2 | 2731 | 2 |
| CO | PPM | 5000 | 0 | 5000 | 0 |
| $CO_2$ | % | 13.87 | 13.9 | 13.99 | 14.27 |

It should be noted that the embodiments of the present invention discussed above are illustrative examples. In this regard, while the use of radiant energy to produce ozone is described above, the present invention is not so limited and other devices, well known in the art, which produce ozone are envisioned as sources for adding ozone to the combustion flow stream in accordance with the teachings of the present invention.

In addition, it should be noted that the only requirement of the present invention is that the ozone is added to the combustion flow stream at at least one point upstream of the catalytic converter, for example, the air intake duct to the carburetor or fuel injection systems of the combustion chamber, the air/fuel intake manifold to the combustion chamber, the combustion chamber directly or the exhaust manifold of the combustion chamber, or the exhaust pipe A as shown in FIG. 1.

Figure 4:
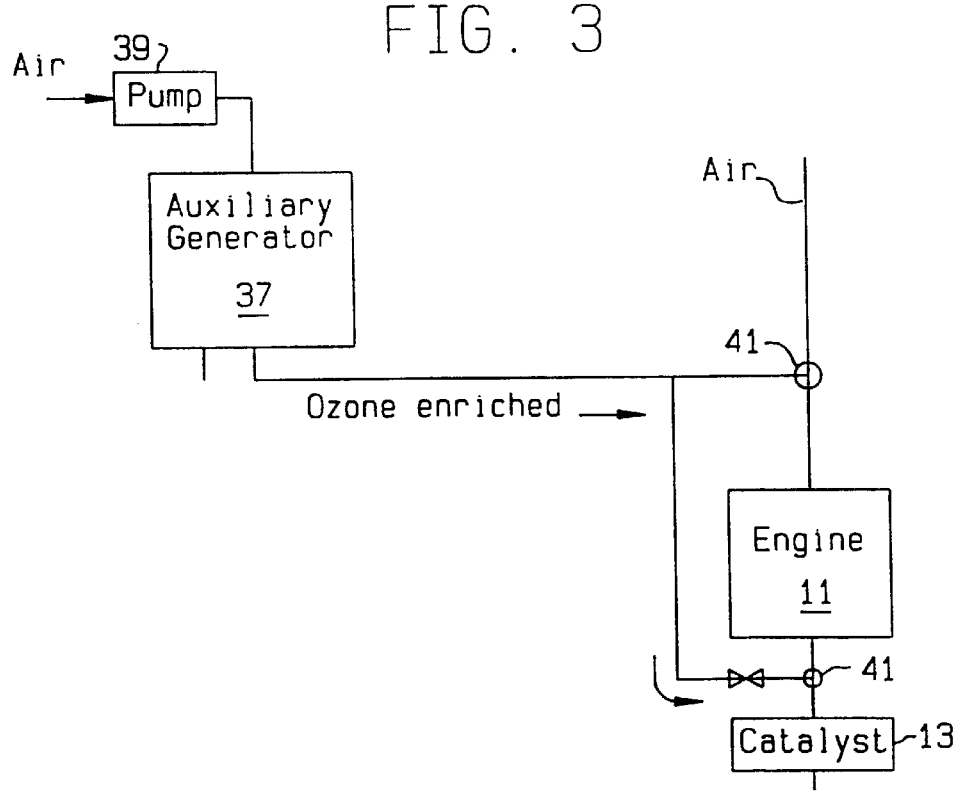
FIG. 4 is a block diagram illustrating another embodiment of the apparatus of the present invention wherein the device for adding ozone is positioned remotely of the pre-combustion and post-combustion flow streams and ozone enriched air is piped into the combustion flow stream.

Referring to FIG. 4, the method of the present invention is illustrated and comprises the steps of: 1) adding ozone to the combustion flow stream at at least one point upstream from a catalytic converter for treating exhaust gases produced from the combustion of a fuel to at least reduce one pollutant from incomplete combustion and/or oxides of nitrogen, and 2) treating the exhaust gases with the catalytic converter.

Although the present invention has been described with particular reference to its preferred embodiments, it should be understood that many variations and modifications will now be obvious to those skilled in that art, and it is preferred, therefore, that the scope of the invention be limited, not be the specific disclosure herein, but only by the appended claims.

What is claimed is:

1. A method for improving the performance of a catalytic converter in a gas flow stream produced from the combustion of fuel, the method comprising:

positioning at least a portion of a device, which generates ozone in ambient air, into the gas flow stream;

providing a high frequency current to the device;

exposing at least a portion of the gas flow stream to the effects of the device;

positioning the catalytic converter such that at least a portion of the catalytically active material is downstream of the device; and passing at least a portion of the gas flow stream exposed to the effects of the device through at least a portion of the catalytic converter, thereby improving the catalytic converter's reduction of at least one pollutant selected from the group consisting of products of incomplete combustion of fuel and oxides of nitrogen from a first concentration to a second lower concentration.

2. The method according to claim 1 wherein the device consumes low power.

3. The method according to claim 2 wherein the device consumes approximately 4 to approximately 40 watts of power.

4. The method according to claim 1 further comprising continuously powering the device.

5. The method according to claim 1 wherein the high frequency current has a frequency of at least about 1,000 Hertz.

6. The method according to claim 5 conducted in the absence of any reducing agent added to the gas flow prior to its exposure to the device.

7. The method according to claim 6 further comprising continuously powering the device.

8. The method according to claim 1 wherein the device only acts on a portion of the gas flow.

9. The method according to claim 7 used for treating the exhaust gases produced by an internal combustion engine.

10. The method according to claim 9 wherein the gas flow stream is formed by the combustion of fuel in an internal combustion engine which burns fuel at or substantially near stoichiometric conditions.

11. The method according to claim 9 wherein the gas flow stream is produced by the combustion of fuel in an internal combustion engine which burns fuel under oxygen-rich conditions.

12. The method according to claim 9 wherein the catalytic converter is a three-way catalytic converter.

13. The method according to claim 9 further comprising channeling the exhaust gases through a metal exhaust pipe wherein at least a portion of the device is positioned in the metal exhaust pipe of a motor vehicle.

14. The method according to claim 1 wherein the catalytic converter does not contain a zeolite.

15. The method according to claim 14 wherein the catalytic converter includes noble metals.

16. A method for decreasing at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method comprising:

positioning at least a portion of a generator, which generates ozone in ambient air, in the exhaust passageway;

providing high frequency current to the generator;

positioning catalytically active material in the exhaust passageway such that at least a portion of said material is located downstream from the generator.

17. The method according to claim 16 further comprising exposing at least a portion of the exhaust gas stream to the generator; and exposing at least a portion of the exhaust gas stream exposed to the effects of the generator to at least a portion of the catalytically active material.

18. The method according to claim 17 wherein the generator is configured and adapted to consume low power.

19. The method according to claim 18 wherein the generator is configured and adapted to consume approximately 4 to approximately 40 watts of power.

20. The method according to claim 17 wherein the generator is continuously provided with high frequency current substantially whenever the engine is running.

21. The method according to claim 20 wherein the generator only acts on a portion of the exhaust gas stream.

22. The method according to claim 16 further comprising powering the generator by an alternating current at a frequency of at least about 1000 Hz.

23. The method according to claim 17 wherein the internal combustion engine is a spark-ignition engine.

24. The method according to claim 17 wherein the internal combustion engine consumes diesel fuel.

25. The method according to claim 24 wherein the generator is continuously provided with high frequency current substantially whenever the engine is running.

26. The method according to claim 23 wherein the exhaust gases are produced by the combustion of gasoline at or substantially near stoichiometric conditions.

27. The method according to claim 26 further comprising a three-way catalytic converter.

28. The method according to claim 23 wherein the exhaust gases are produced by the combustion of gasoline under oxygen-rich conditions.

29. The method according to claim 17 conducted in the absence of any reducing agent added to the exhaust gas stream in the exhaust passageway prior to the catalytically active material.

30. The method according to claim 17 wherein the catalytically active material is contained in a catalytic converter.

31. The method according to claim 30 wherein the decrease in the pollutants selected from the group consisting of products of incomplete combustion of fuel and oxides of nitrogen occurs substantially within the catalytic converter.

32. The method according to claim 29 wherein the high frequency current is supplied at a frequency of at least about 1000 Hz.

33. The method according to claim 29 wherein the catalytically active material comprises a monolithic structure.

34. The method according to claim 29 wherein the catalytically active material forms part of a three-way catalytic converter.

35. The method according to claim 34 further comprising supplying current having a frequency of at least about 1000 Hz.

36. The method according to claim 22 further comprising powering the generator at a frequency of less than about 30 kilohertz.

37. The method according to claim 29 wherein the exhaust gas is formed by the combustion of a substantially stoichiometric mixture of fuel and air.

38. The method according to claim 29 wherein the catalytically active material is contained in a catalytic converter.

39. The method according to claim 38 wherein the catalytic converter includes noble metals.

40. The method according to claim 29 wherein the catalytically active material does not contain a zeolite.

41. The method according to claim 29 wherein the exhaust gases are produced by the combustion of fuel in an internal combustion engine under oxygen-rich conditions.

42. The method according to claim 41 wherein the exhaust gases are produced by the combustion of diesel fuel.

43. The method according to claim 42 wherein the catalytically active material comprises noble metals.

44. The method according to claim 42 wherein the catalytically active material is contained in a catalytic converter.

45. The method according to claim 44 wherein the catalytic converter comprises at least one monolithic substrate.

46. The method according to claim 44 wherein the catalytic converter comprises a ceramic-type catalyst.

47. The method according to claim 44 wherein the catalytic converter comprises zeolite.

48. The method according to claim 29 further comprising positioning a substantial portion of the catalytically active material downstream of the generator.

49. The method according to claim 48 further comprising positioning all of the catalytically active material downstream of the generator.

50. The method according to claim 38 further comprising positioning the generator upstream and separate from the catalytically active material.

51. A method for reducing at least one pollutant selected from the group consisting of products of incomplete combustion of fuel and oxides of nitrogen from a first concentration to a second lower concentration in an exhaust gas stream containing exhaust gases formed from the combustion of diesel fuel in a diesel engine of a motor vehicle having an exhaust passageway for channeling the exhaust gas stream from the diesel engine, the method comprising:

channeling at least a portion of the exhaust gas stream through the exhaust passageway;

positioning at least a portion of a generator, which generates ozone in ambient air, in the exhaust passageway;

providing a power supply which supplies power to the generator, the power supply using approximately 0.01% to approximately 0.1% of the rated engine power;

positioning catalytically active material in the exhaust passageway, such that at least of a portion of which is located downstream from the generator;

exposing at least a portion of the exhaust gases to the effects of the generator; and passing at least a portion of the exposed exhaust gases through at least a portion of the catalytically active material located downstream from the generator thereby decreasing at least one pollutant selected from the group consisting of products of incomplete combustion of fuel and oxides of nitrogen from a first concentration to a second lower concentration.

52. The method according to claim 51 wherein the generator comprises an electric discharge device.

53. The method according to claim 52 wherein the generator is separate from the catalytically active material.

54. The method according to claim 52 wherein a substantial portion of the catalytically active material is located downstream from the generator.

55. The method according to claim 54 wherein the power supply supplies high-frequency alternating current.

56. The method according to claim 55 wherein the power supply supplies alternating current having a frequency of between about 1,000 Hertz and about 30 kilohertz.

57. The method according to claim 56 wherein the catalytically active material comprises a monolithic substrate.

58. The method according to claim 57 wherein the power supply supplies power to the generator substantially whenever the engine produces exhaust gases.

59. The method according to claim 58 wherein the catalytically active material comprises noble metals.

60. The method according to claim 52 wherein the generator comprises an electrostatic discharge device.

61. The method according to claim 51 wherein the generator comprises an ultraviolet light source.

62. The method according to claim 51 conducted in the absence of any reducing agent added to the exhaust gases in the exhaust passageway.

63. A method for decreasing at least one pollutant selected from the group consisting of products of incomplete combustion of fuel and oxides of nitrogen from a first concentration to a second lower concentration in an exhaust gas stream containing exhaust gases formed from the combustion of fuel in a spark-ignition internal combustion engine of a mobile vehicle having an exhaust passageway for conducting the exhaust gas from the engine, the method comprising;

channeling at least a portion of the exhaust gas stream through the passageway;

positioning at least a portion of a generator, which generates ozone in ambient air, in the exhaust passageway;

providing a power supply which supplies power to the generator and uses approximately 0.01% to about 0.1% of the rated engine power;

positioning catalytically active material in the exhaust passageway, at least a portion of which is located downstream from the generator;

exposing at least a portion of the exhaust gases to the effects of the generator; and passing at least a portion of the exposed exhaust gases through at least a portion of the catalytically active material located downstream from the generator thereby decreasing at least one pollutant selected from the group consisting of products of incomplete combustion of fuel and oxides of nitrogen from a first concentration to a second lower concentration.

64. The method according to claim 63 conducted in the absence of any reducing agent added to the exhaust gases in the exhaust passageway.

65. The method according to claim 64 wherein the power supply supplies the generator with power substantially whenever the engine produces exhaust gases.

66. The method according to claim 65 wherein the power supply supplies high-frequency current to the generator.

67. The method according to claim 66 wherein the generator is an electric discharge device.

68. The method according to claim 66 wherein the generator comprises an ultraviolet light source.

69. The method according to claim 66 wherein the power supply supplies alternating current to the electric discharge device having a frequency between about 1,000 Hertz and about 30 Kilohertz.

70. The method according to claim 63 wherein the catalytically active material is a monolithic substrate.

71. The method according to claim 69 wherein the exhaust gases are formed by the combustion of a substantially oxygen-rich mixture of fuel and air.

72. The method according to claim 63 wherein a substantial portion of the catalytically active material is located downstream from the generator.

73. The method according to claim 63 wherein all of the catalytically active material is separate from and downstream from the generator.

74. The method according to claim 69 wherein the exhaust gases are formed by the combustion of a substantially stoichiometric mixture of fuel and air.

75. A method for decreasing at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method comprising;

positioning at least a portion of an electric discharge device in the exhaust passageway upstream of at least a portion of catalytically active material;

providing high frequency current to the electric discharge device;

exposing at least a portion of the exhaust gases to the output of the electric discharge device; and passing at least a portion of the exposed exhaust gases through at least a portion of the catalytically active material, thereby decreasing at least one pollutant selected from the group consisting of products of incomplete combustion of fuel and oxides of nitrogen from a first concentration to a second lower concentration.

76. The method according to claim 75 wherein the high frequency current has a frequency of at least about 1,000 Hz.

77. The method according to claim 76 wherein the high frequency current has a frequency between about 1,000 Hz to about 30,000 Hz.

78. The method according to claim 75 wherein the high frequency current has a voltage of about 1 kV to about 20 kV.

79. The method according to claim 75 wherein the electric discharge device is an electrostatic discharge device.

80. The method according to claim 75 applied to the exhaust system of a mobile vehicle.

81. The method according to claim 75 further comprising providing electrical power to the electric discharge device substantially whenever the combustion engine is producing exhaust gas.

82. The method according to claim 75 wherein low power is supplied to the electric discharge device.

83. The method according to claim 82 wherein the electric discharge device uses approximately 4 to approximately 40 watts of power.

84. The method according to claim 75 wherein the electric discharge device uses approximately 0.01% to approximately 0.1% of the rated engine power.

85. The method according to claim 75 wherein the electric discharge device only acts on a portion of the gas stream.

86. The method according to claim 75 conducted in the absence of any reducing agent added to the exhaust gases in the exhaust passageway prior to the electric discharge device.

87. The method according to claim 86 wherein the exhaust gases are produced from the combustion of a substantially stoichiometric mixture of fuel and air.

88. The method according to claim 86 wherein the catalytically active material comprises noble metals.

89. The method according to claim 86 wherein the catalytically active material is contained within a catalytic converter.

90. The method according to claim 89 wherein the catalytic converter is a three-way catalytic converter.

91. The method according to claim 86 wherein the catalytically active material does not contain a zeolite.

92. The method according to claim 86 wherein the high frequency current has a frequency of at least 1000 Hz.

93. The method according to claim 92 wherein the frequency applied to the electric discharge device is less than about 30 Kilohertz.

94. The method according to claim 86 wherein the exhaust gases are produced from the combustion of fuel under oxygen rich conditions.

95. The method according to claim 94 wherein the catalytically active material is contained within a catalytic converter.

96. The method according to claim 95 wherein the catalytically active material comprises zeolite.

97. The method according to claim 96 wherein the catalytic converter consists essentially of zeolite.

98. The method according to claim 96 wherein the frequency applied to the electric discharge device has a frequency of at least about 1000 Hz.

99. The method according to claim 98 wherein the frequency applied to the electric discharge device is less than about 30 kilohertz.

100. The method according to claim 94 wherein the electrical power is supplied to the electric discharge device by a power supply connected to the electrical system of the mobile vehicle and which supplies high-voltage, high-frequency alternating current to the discharge device.

101. The method according to claim 100 wherein the frequency of the alternating current supplied to the electric discharge device is less than about 30 kilohertz.

102. The method according to claim 100 wherein about 1 kilovolt to about 20 kilovolts is applied to the electric discharge device.

103. The method according to claim 100 further comprising supplying high-voltage, high-frequency alternating current to the electric discharge device substantially continuously whenever the combustion engine is producing exhaust gas.

104. The method according to claim 89 wherein the catalytically active material includes noble metals.

105. The method according to claim 94 wherein the catalytically active material comprises at least a monolithic substrate.

106. The method according to claim 94 wherein the catalytically active material comprises a ceramic-type catalyst.

107. The method according to claim 86 wherein the electric discharge device is positioned upstream of a substantial portion of the catalytically active material.

108. The method according to claim 86 wherein the electric discharge device is positioned upstream of all the catalytically active material.

109. The method according to claim 89 further comprising positioning the electric discharge device separate from and upstream of the catalytic converter.

110. A method for improving the performance of a catalytic converter to decrease at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method comprising:

positioning at least a portion of an electric discharge device in the exhaust passageway upstream of at least a portion of the catalytically active material of the catalytic converter;

providing high frequency current to the electric discharge device;

exposing at least a portion of the exhaust gases to the output of the electric discharge device; and passing at least a portion of the exposed exhaust gases through at least a portion of the catalytically active material of the catalytic converter, thereby improving the catalytic converter's capability of decreasing at least one pollutant selected from the group consisting of products of incomplete combustion of fuel and oxides of nitrogen.

111. The method according to claim 110 wherein a high-voltage, high-frequency, alternating current is supplied to the discharge device substantially whenever the engine produces exhaust gas.

112. The method according to claim 111 wherein the frequency applied to the electric discharge device is between about 1000 Hertz and about 30 kilohertz.

113. The method according to claim 111 wherein about 1 kilovolt to about 20 kilovolts is applied to the electric discharge device.

114. The method according to claim 111 wherein the catalytic converter comprises zeolite.

115. The method according to claim 111 wherein the catalytic converter is a three-way catalyst.

116. The method according to 111 wherein the catalytic converter includes noble metals.

117. The method according to claim 116 wherein the catalytic converter comprises noble metals selected from the group comprising platinum (Pt), palladium (Pd) and rhodium (Rh).

118. The method according to claim 111 wherein the catalytic converter comprises a monolithic substrate.

119. The method according to claim 110 applied to the exhaust system of a mobile vehicle.

120. The method according to claim 119 wherein a power supply is connected to the electric discharge device and the power supply uses low power.

121. The method according to claim 120 wherein the electric discharge device uses approximately 4 to approximately 40 Watts.

122. The method according to claim 120 wherein the electric discharge device is separate from the catalytic converter.

123. A method for improving the performance of a catalytic converter to decrease at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method comprising:

positioning at least a portion of an electric discharge device in the exhaust passageway;

providing high frequency current to the electric discharge device substantially whenever the engine produces exhaust gases;

exposing at least a portion of the exhaust gases to the output of the electric discharge device;

positioning a catalytic converter in the exhaust passageway such that at least a portion of the catalytic material is positioned downstream of the electric discharge device; and passing at least a portion of the exposed exhaust gases through at least a portion of the catalytically active material of the catalytic converter in the absence of any reducing agent added to the exhaust gases in the exhaust passageway to thereby improve the catalytic converter's capability of decreasing at least one pollutant selected from the group consisting of products of incomplete combustion of fuel and oxides of nitrogen from a first concentration to a second lower concentration.

124. The method according to claim 123 applied to the exhaust system of a mobile vehicle.

125. The method according to claim 123 wherein a substantial portion of the catalytically active material of the catalytically converter is positioned downstream of the electric discharge device.

126. The method according to claim 123 wherein all of the catalytically active material is positioned downstream from the electric discharge device.

127. The method according to claim 123 wherein the electric discharge device is separate from the catalytically active material of the catalytic converter.

128. The method according to claim 123 wherein the discharge device only acts on a portion of the exhaust gas flow.

129. The method according to claim 123 further comprising powering the discharge device by an alternating current at a frequency of at least about 1000 Hz.

130. The method according to claim 129 further comprising powering the discharge device by an alternating current at a frequency of up to about 30 kilohertz.

131. The method according to claim 123 wherein the electric discharge device is an electrostatic discharge device.

132. The method according to claim 123 wherein the exhaust gas is formed by the combustion of a substantially stoichiometric mixture of fuel and air.

133. The method according to claim 132 wherein the catalytic converter is a three-way catalytic converter.

134. The method according to claim 133 wherein the catalytic converter includes noble metals.

135. The method according to claim 133 wherein the catalyst converter does not contain a zeolite.

136. The method according to claim 123 wherein a power supply provides alternating current to the electric discharge device and the power supply uses low power.

137. The method according to claim 136 wherein the power supply uses approximately 4 to approximately 40 watts of power.

138. The method according to claim 125 wherein the exhaust gases are produced by the combustion of fuel in an internal combustion engine under oxygen-rich conditions.

139. The method according to claim 138 wherein the exhaust gases are produced by the combustion of diesel fuel.

140. The method according to claim 139 wherein the catalytic converter includes noble metals.

141. The method according to claim 123 wherein the catalytic converter comprises a monolithic substrate.

142. The method according to claim 141 wherein the catalytic converter comprises a ceramic-type catalyst.

143. The method according to claim 139 wherein the catalytic converter comprises zeolite.

144. A method for decreasing at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method comprising:

positioning at least a portion of at least one electric discharge device in the exhaust passageway;

providing electrical power to the electric discharge device having a frequency of at least about 1,000 Hertz;

exposing at least a portion of the exhaust gases to the output of the electric discharge device;

positioning in the exhaust passageway catalytically active material at least a portion of which is not exposed to the output of the electric discharge device; and passing at least a portion of the exposed exhaust gases through at least a portion of the catalytically active material.

145. The method according to claim 144 wherein the catalytically active material positioned within the exhaust passageway is not exposed to the output of any electric discharge device.

146. The method according to claim 144 wherein the electric discharge device is an electrostatic discharge device.

147. The method according to claim 144 applied to the exhaust system of a mobile vehicle.

148. The method according to claim 144 further comprising providing electrical power to the electric discharge device substantially whenever the combustion engine is producing exhaust gas.

149. The method according to claim 148 wherein the catalytically active material is in a catalytic converter.

150. The method according to claim 148 wherein low power is supplied to the electrical discharge device.

151. The method according to claim 150 wherein approximately 4 to approximately 40 watts of power is supplied to the electric discharge device.

152. The method according to claim 144 wherein the electric discharge device is connected to the electrical system of the internal combustion engine and uses approximately 0.01% to approximately 0.1% of the rated engine power.

153. The method according to claim 149 wherein the catalytic converter is separate from and downstream from the electric discharge device.

154. The method according to claim 144 wherein the electric discharge device only acts on a portion of the gas stream.

155. The method according to claim 144 wherein the exhaust gases are produced from the combustion of a substantially stoichiometric mixture of fuel and air.

156. The method according to claim 149 wherein the catalytic converter contains noble metals.

157. The method according to claim 156 wherein the catalytic converter is a three-way catalytic converter.

158. The method according to claim 155 wherein the catalytically active material is not primarily a zeolite.

159. The method according to claim 144 wherein the frequency applied to the electric discharge device is less than about 30 kilohertz.

160. The method according to claim 149 wherein the exhaust gases are produced from the combustion of fuel under oxygen rich conditions.

161. The method according to claim 160 wherein the catalytic converter comprises zeolite.

162. The method according to claim 161 wherein the catalytic converter consists essentially of zeolite.

163. The method according to claim 161 wherein the frequency applied to the electric discharge device is less than about 30 Kilohertz.

164. The method according to claim 161 wherein the electrical power is supplied to the electric discharge device by a power supply which supplies high-voltage, high-frequency alternating current to the discharge device.

165. The method according to claim 164 wherein the frequency of the alternating current supplied to the electric discharge device is less than about 30 kilohertz.

166. The method according to claim 164 wherein about 1 Kilovolt to about 20 Kilovolts is applied to the electric discharge device.

167. The method according to claim 160 further comprising supplying a high-voltage, high-frequency alternating current to the electric discharge device substantially continuously whenever the combustion engine is producing exhaust gas.

168. The method according to claim 167 wherein the catalytic converter includes noble metals.

169. The method according to claim 149 wherein the catalytic converter comprises a monolithic substrate.

170. The method according to claim 149 wherein the catalytic converter comprises a ceramic-type catalyst.

171. The method according to claim 144 wherein the electrical discharge device is supplied with electrical power substantially whenever the engine produces exhaust gases.

172. The method according to claim 144 conducted in the absence of any reducing agent added to the exhaust gases in the exhaust passageway.

173. A method to decrease at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method comprising:

positioning at least a portion of an electric discharge device in the exhaust passageway;

providing high frequency current to the electric discharge device substantially whenever the engine produces exhaust gases;

exposing at least a portion of the exhaust gases to the output of the electric discharge device;

positioning catalytically active material in the exhaust passageway such that at least a portion of the catalytically active material is positioned downstream of the electric discharge device; and passing at least a portion of the exposed exhaust gases through at least a portion of the catalytically active material in the absence of any reducing agent added to the exhaust gases in the exhaust passageway to thereby decrease at least one pollutant selected from the group consisting of products of incomplete combustion of fuel and oxides of nitrogen from a first concentration to a second lower concentration.

174. The method according to claim 173 applied to the exhaust system of a mobile vehicle.

175. The method according to claim 173 wherein a substantial portion of the catalytically active material is positioned downstream of the electric discharge device.

176. The method according to claim 173 wherein all of the catalytically active material is positioned downstream from the electric discharge device.

177. The method according to claim 173 wherein the electric discharge device is separate from the catalytically active material.

178. The method according to claim 173 wherein the discharge device only acts on a portion of the exhaust gas flow.

179. The method according to claim 173 further comprising powering the discharge device by an alternating current at a frequency of at least about 1000 Hz.

180. The method according to claim 179 further comprising powering the discharge device by an alternating current at a frequency of up to about 30 Kilohertz.

181. The method according to claim 173 wherein the electric discharge device is an electrostatic discharge device.

182. The method according to claim 173 wherein the exhaust gas is formed by the combustion of a substantially stoichiometric mixture of fuel and air.

183. The method according to claim 182 wherein the catalytically active material is contained in a three-way catalytic converter.

184. The method according to claim 183 wherein the catalytic converter includes noble metals.

185. The method according to claim 183 wherein the catalytic converter does not contain a zeolite catalyst.

186. The method according to claim 173 wherein a power supply provides alternating current to the electric discharge device and the power supply uses low power.

187. The method according to claim 186 wherein the power supply uses approximately 4 to approximately 40 watts of power.

188. The method according to claim 173 wherein the exhaust gases are produced by the combustion of fuel in an internal combustion engine under oxygen-rich conditions.

189. The method according to claim 188 wherein the exhaust gases are produced by the combustion of diesel fuel.

190. The method according to claim 189 wherein the catalytic converter includes noble metals.

191. The method according to claim 173 wherein the catalytic converter comprises a monolithic substrate.

192. The method according to claim 191 wherein the catalytic converter comprises a ceramic-type catalyst.

193. The method according to claim 189 wherein the catalytic converter comprises zeolite.

194. The method according to claim 173 wherein the high frequency current has a voltage between about 1 kV and about 20 kV.

195. A method for improving the performance of a catalytic converter to decrease at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method consisting essentially of:

positioning at least a portion of an electric discharge device in the exhaust passageway upstream of a substantial portion of the catalytically active material of the catalytic converter;

providing high-frequency current to the electric discharge device substantially whenever the engine produces exhaust gases;

exposing at least a portion of the exhaust gases to the output of the electric discharge device; and passing at least a portion of the exposed exhaust gases through at least a portion of the catalytically active material of the catalytic converter, thereby improving the catalytic converter's capability of decreasing at least one pollutant selected from the group consisting of products of incomplete combustion of fuel and oxides of nitrogen.

196. The method according to claim 195 wherein the frequency applied to the electric discharge device is between about 1,000 Hertz and about 30 kilohertz.

197. The method according to claim 196 wherein the catalytic converter comprises at least one honeycomb monolithic substrate.

198. The method according to claim 197 wherein the catalytic converter includes noble metals.

199. The method according to claim 198 wherein the catalytic converter is a three-way catalyst.

200. The method according to claim 199 applied to the exhaust system of a mobile vehicle.

201. The method according to claim 200 wherein the electric discharge device is separate from and positioned upstream of the catalytic converter.

202. The method according to claim 195 wherein the internal combustion engine is a spark ignition engine.

203. The method according to claim 195 wherein the internal combustion engine is a diesel engine.

204. The method according to claim 202 wherein the spark ignition engine uses an essentially stoichiometric mixture of fuel and air.

205. The method according to claim 195 wherein the catalytically active material does not contain a zeolite.

206. A method for decreasing at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method consisting essentially of:

positioning at least a portion of at least one electric discharge device in the exhaust passageway;

providing a power supply which supplies high-frequency current to the electric discharge device substantially whenever exhaust gases are produced by the engine;

positioning catalytically active material in the exhaust passageway, at least a portion of which is located downstream from the electric discharge device;

exposing at least a portion of the exhaust gases to the output of the electric discharge device; and passing at least a portion of the exposed exhaust gases through at least a portion of the catalytically active material located downstream from the electric discharge device to thereby decrease at least one pollutant consisting of the group of products of incomplete combustion of fuel and oxides of nitrogen from a first concentration to a second lower concentration.

207. The method according to claim 206 wherein a substantial portion of the catalytically active material is located downstream from the electric discharge device.

208. The method according to claim 207 wherein the power supply uses low power.

209. The method according to claim 206 wherein the internal combustion engine is a spark ignition engine.

210. The method according to claim 206 wherein the internal combustion engine is a diesel engine.

211. The method according to claim 209 wherein the spark ignition engine uses an essentially stoichiometric mixture of fuel and air.

212. The method according to claim 206 wherein the catalytically active material does not contain a zeolite.

213. A method for decreasing at least one pollutant selected from the group consisting of products of incomplete combustion of fuel and oxides of nitrogen from a first concentration to a second concentration in an exhaust gas stream containing exhaust gases formed from the combustion of diesel fuel in a diesel engine having an exhaust passageway for channeling the exhaust gas stream from the diesel engine, the device comprising:

positioning at least a portion of an electric discharge device in the exhaust passageway;

providing high-frequency current to the electric discharge device substantially whenever the engine produces exhaust gases;

positioning catalytically active material in the exhaust passageway such that a substantial portion is located downstream of the electric discharge device;

exposing at least a portion of the exhaust gases to the output of the electric discharge device; and passing at least a portion of the exposed exhaust gases through at least a portion of the catalytically active material in the absence of any reducing agent added to the exhaust gases in the exhaust passageway to thereby decrease at least one pollutant selected from the group consisting of products of incomplete combustion of fuel and oxides of nitrogen from a first concentration to a second lower concentration.

214. The method according to claim 213 wherein the catalytically active material comprises at least one monolithic substrate.

215. The method according to claim 214 wherein the catalytically active material comprises at least one honeycomb monolithic substrate.

216. The method according to claim 215 wherein the electric discharge device is supplied with alternating current having a frequency between about 1,000 Hertz and about 30 kilohertz.

217. The method according to claim 216 wherein the catalytically active material comprises noble metals.

218. The method according to claim 214 wherein the catalytically active material comprises a zeolite.

219. The method according to claim 218 wherein the electric discharge device is located in the exhaust manifold of the diesel engine.

220. The method according to claim 219 applied to the exhaust system of a motor vehicle.

221. The method according to claim 220 wherein the electric discharge device is positioned in a metal exhaust pipe of the exhaust system of the motor vehicle.

222. The method according to claim 213 wherein the catalytically active material is not primarily a zeolite.

223. The method according to claim 213 wherein the electric discharge device is configured and adapted to consume low power.

224. The method according to claim 213 wherein the catalytically active material is separate from and downstream from the electric discharge device.

225. The method according to claim 213 wherein the diesel engine is located on a mobile vehicle.

226. The method according to claim 213 wherein the catalytically active material is contained in a catalytic converter.

227. A method to decrease at least one pollutant selected from the group consisting of products of incomplete combustion of fuel and oxides of nitrogen from a first concentration to a second lower concentration in an exhaust gas stream containing exhaust gases formed from the combustion of fuel in a spark-ignition internal combustion engine having an exhaust passageway for communicating the exhaust gas stream from the internal combustion engine, the method comprising:

channeling at least a portion of the exhaust gases through the exhaust passageway;

positioning at least a portion of an electric discharge device in the exhaust passageway;

supplying the electric discharge device with a high-frequency current substantially whenever the engine produces exhaust gases;

positioning catalytically active material in the exhaust passageway such that a substantial portion of the catalytically active material is located downstream from the electric discharge device;

exposing at least a portion of the exhaust gases in the exhaust passageway to the output of the electric discharge device; and passing at least a portion of the exposed exhaust gases through at least a portion of the catalytically active material in the absence of any reducing agent added to the exhaust gases in the exhaust passageway to thereby decrease at least one pollutant selected from the group consisting of products of incomplete combustion of fuel and oxides of nitrogen from a first concentration to a second lower concentration.

228. The method according to claim 227 wherein the catalytically active material is contained in a catalytic converter.

229. The method according to claim 227 wherein alternating current having a frequency of between about 1,000 Hertz and about 30 Kilohertz is supplied to the electric discharge device.

230. The method according to claim 228 wherein the catalytically active material comprises noble metals.

231. The method according to claim 229 wherein the catalytic converter comprises a three-way catalyst.

232. The method according to claim 230 wherein the catalytic converter comprises at least one monolithic substrate.

233. The method according to claim 231 wherein the catalytic converter does not primarily contain a zeolite.

234. The method according to claim 232 wherein the electric discharge device uses approximately 4 to approximately 40 watts of power.

235. The method according to claim 233 wherein the exhaust gas is formed by the combustion of a substantially stoichiometric mixture of fuel and air.

236. The method according to claim 234 wherein the electric discharge device is separate from the catalytic converter.

237. The method according to claim 235 wherein the catalytically active material of the catalytic converter is not exposed to the output of the electric discharge device.

238. The method according to claim 236 wherein the electric discharge device is separate from and positioned upstream from the catalytic converter.

239. A method for decreasing at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine having an exhaust passageway for channeling the exhaust gas stream from the internal combustion engine, the method comprising:

positioning an electric discharge device in the exhaust gas stream;

providing a power supply which supplies power to the electric discharge device wherein the power supply uses approximately 0.01% to approximately 0.1% of the rated engine power;

positioning catalytically active material in the exhaust passageway, at least a portion of the catalytically active material positioned downstream from the electric discharge device;

exposing at least a portion of the exhaust gases to the output of the electric discharge device; and passing at least a portion of the exposed exhaust gases through at least a portion of the catalytically active material positioned downstream from the electric discharge device to thereby decrease at least one pollutant selected from the group consisting of products of incomplete combustion of fuel and oxides of nitrogen from a first concentration to a second lower concentration.

240. The method according to claim 239 conducted in the absence of any reducing agent added to the exhaust gases in the exhaust passageway.

241. The method according to claim 240 wherein the catalytically active material comprises noble metal.

242. The method according to claim 241 wherein a substantial portion of the catalytically active material is positioned downstream from the electric discharge device.

243. The method according to claim 242 wherein all of the catalytically active material is positioned downstream from the electrical discharge device.

244. The method according to claim 243 wherein the discharge device is separate from and positioned upstream of the catalytically active material.

245. The method according to claim 244 wherein the catalytically active material is within a catalytic converter.

246. The method according to claim 245 wherein the catalytically active material comprises zeolites.

247. A device for decreasing at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine, comprising:

an exhaust passageway for channeling at least a portion of the exhaust gas stream from the internal combustion engine;

a generator, which generates ozone in ambient air, located in the exhaust passageway;

a power supply, which supplies high frequency current to the generator; and catalytically active material, wherein at least a portion of the catalytically active material is located downstream from the generator.

248. The device according to claim 247 wherein the device is adapted and configured such that at least a portion of the exhaust gas stream is exposed to the generator and said portion of the exhaust gas stream is then exposed to at least a portion of the catalytically active material.

249. The device according to claim 248 wherein the generator is configured and adapted to consume low power.

250. The device according to claim 249 wherein the generator is configured and adapted to consume approximately 4 to approximately 40 watts of power.

251. The device according to claim 248 wherein the generator is continuously provided with high frequency current substantially whenever the engine is running.

252. The device according to claim 251 wherein the generator only acts on a portion of the exhaust gas flow.

253. The device according to claim 247 further comprising powering the generator by an alternating current at a frequency of at least about 1000 Hz.

254. The device according to claim 248 wherein the internal combustion engine is a spark-ignition engine.

255. The device according to claim 248 wherein the internal combustion engine consumes diesel fuel.

256. The device according to claim 255 wherein the generator is continuously provided with high frequency current substantially whenever the engine is running.

257. The device according to claim 254 wherein the exhaust gases are produced by the combustion of gasoline at or substantially near stoichiometric conditions.

258. The device according to claim 257 further comprising a three-way catalytic converter.

259. The device according to claim 254 wherein the exhaust gases are produced by the combustion of gasoline under oxygen-rich conditions.

260. The device according to claim 251 operated in the absence of any reducing agent added to the exhaust gas stream in the exhaust passageway prior to the generator.

261. The device according to claim 251 wherein the catalytically active material is contained in a catalytic converter.

262. The device according to claim 261 wherein the reduction in the pollutants selected from the group consisting of products of incomplete combustion of fuel and oxides of nitrogen occurs substantially within the catalytic converter.

263. The device according to claim 260 wherein the high frequency current is supplied at a frequency of at least about 1000 Hz.

264. The device according to claim 260 wherein the catalytically active material comprises a monolithic structure.

265. The device according to claim 260 wherein the catalytically active material forms part of a three-way catalytic converter.

266. The device according to claim 265 further comprising supplying alternative current having a frequency of at least about 1000 Hz.

267. The device according to claim 253 further comprising powering the generator at a frequency of less than about 30 kilohertz.

268. The device according to claim 260 wherein the exhaust gas is formed by the combustion of a substantially stoichiometric mixture of fuel and air.

269. The device according to claim 260 wherein the catalytically active material is contained in a catalytic converter.

270. The device according to claim 269 wherein the catalytic converter includes noble metals.

271. The device according to claim 260 wherein the catalytically active material is not primarily a zeolite catalyst.

272. The device according to claim 260 wherein the exhaust gases are produced by the combustion of fuel in an internal combustion engine under oxygen-rich conditions.

273. The device according to claim 272 wherein the exhaust gases are produced by the combustion of diesel fuel.

274. The device according to claim 273 wherein the catalytically active material comprises noble metals.

275. The device according to claim 273 wherein the catalytically active material is contained in a catalytic converter.

276. The device according to claim 275 wherein the catalytic converter comprises at least one monolithic substrate.

277. The device according to claim 273 wherein the catalytic converter comprises a ceramic-type catalyst.

278. The device according to claim 273 wherein the catalytic converter comprises zeolite.

279. The device according to claim 260 wherein a substantial portion of the catalytically active material is downstream of the generator.

280. The device according to claim 279 wherein all of the catalytically active material is downstream of the generator.

281. The device according to claim 269 wherein the generator is upstream and separate from the catalytically active material.

282. A device for improving the performance of a catalytic converter to decrease at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine, comprising:
- an exhaust passageway for channeling at least a portion of the exhaust gas stream from the internal combustion engine;
- a generator, which generates ozone in ambient air, located in the exhaust passageway;
- a power supply, which supplies high frequency current to the generator; and
- a catalytic converter having catalytically active material, wherein at least a portion of the catalytically active material is located downstream from the generator.

283. The device according to claim 282 wherein the device is adapted and configured such that at least a portion of the exhaust gas stream is exposed to the generator and said portion of the exhaust gas stream is then exposed to at least a portion of the catalytically active material.

284. The device according to claim 283 wherein the generator is configured and adapted to consume low power.

285. The device according to claim 284 wherein the generator is configured and adapted to consume approximately 4 to approximately 40 watts of power.

286. The device according to claim 283 wherein the generator is continuously provided with high frequency current substantially whenever the engine is running.

287. The device according to claim 286 wherein the generator only acts on a portion of the exhaust gas flow.

288. The device according to claim 282 further comprising powering the generator by an alternating current at a frequency of at least about 1000 Hz.

289. The device according to claim 283 wherein the internal combustion engine is a spark-ignition engine.

290. The device according to claim 283 wherein the internal combustion engine consumes diesel fuel.

291. The device according to claim 290 wherein the generator is continuously provided with high frequency current substantially whenever the engine is running.

292. The device according to claim 289 wherein the exhaust gases are produced by the combustion of gasoline at or substantially near stoichiometric conditions.

293. The device according to claim 292 further comprising a three-way catalytic converter.

294. The device according to claim 289 wherein the exhaust gases are produced by the combustion of gasoline under oxygen-rich conditions.

295. The device according to claim 286 operated in the absence of any reducing agent added to the exhaust gas stream in the exhaust passageway prior to the generator.

296. The device according to claim 286 wherein the catalytically active material is contained in a catalytic converter.

297. The device according to claim 296 wherein the reduction in the pollutants selected from the group consisting of products of incomplete combustion of fuel and oxides of nitrogen occurs substantially within the catalytic converter.

298. The device according to claim 295 wherein the high frequency current is supplied at a frequency of at least about 1000 Hz.

299. The device according to claim 295 wherein the catalytically active material comprises a monolithic structure.

300. The device according to claim 295 wherein the catalytically active material forms part of a three-way catalytic converter.

301. The device according to claim 300 further comprising supplying alternative current having a frequency of at least about 1000 Hz.

302. The device according to claim 298 further comprising powering the generator at a frequency of less than about 30 kilohertz.

303. The device according to claim 295 wherein the exhaust gas is formed by the combustion of a substantially stoichiometric mixture of fuel and air.

304. The device according to claim 295 wherein the catalytically active material is contained in a catalytic converter.

305. The device according to claim 304 wherein the catalytic converter includes noble metals.

306. The device according to claim 295 wherein the catalytically active material does not contain a zeolite.

307. The device according to claim 295 wherein the exhaust gases are produced by the combustion of fuel in an internal combustion engine under oxygen-rich conditions.

308. The device according to claim 307 wherein the exhaust gases are produced by the combustion of diesel fuel.

309. The device according to claim 308 wherein the catalytically active material comprises noble metals.

310. The device according to claim 308 wherein the catalytically active material is contained in a catalytic converter.

311. The device according to claim 310 wherein the catalytic converter comprises at least one monolithic substrate.

312. The device according to claim 308 wherein the catalytic converter comprises a ceramic-type substrate.

313. The device according to claim 308 wherein the catalytic converter comprises zeolite.

314. The device according to claim 295 wherein a substantial portion of the catalytically active material is downstream of the generator.

315. The device according to claim 314 wherein all the catalytically active material is downstream of the generator.

316. The device according to claim 304 wherein the generator is upstream and separate from the catalytically active material.

317. The method according to claim 172 wherein all the exhaust gases are exposed to the output of the electric discharge device.

318. The method according to claim 172 wherein the electric discharge device is supplied with electrical power substantially whenever the engine produces exhaust gases.

* * * * *

Disclaimer 6,253,544—Robert N. Miller, Acworth, GA.; Robert P. Caren, Westlake Village, Calif.; Jack A. Ekchian, Belmont, Mass. METHOD AND APPARATUS FOR REDUCING POLLUTANTS. Patent dated Jul. 3, 2001. Disclaimer filed Sept. 11, 2003, by the assignee, Lockheed Martin Corp.

Hereby enters this disclaimer to claims 16, 17, 22, 24, 75, 78, 110, 119, 144, 145, 247, 253 and 282, of said patent.

*(Official Gazette, November 11, 2003)*